Feb. 13, 1951     L. O. THUNBERG     2,541,895
FLASH SYNCHRONIZER FOR PHOTOGRAPHIC SHUTTERS
Filed Sept. 18, 1947     4 Sheets-Sheet 2

INVENTOR
Leander O. Thunberg
BY
ATTORNEYS

Feb. 13, 1951     L. O. THUNBERG     2,541,895
FLASH SYNCHRONIZER FOR PHOTOGRAPHIC SHUTTERS
Filed Sept. 18, 1947     4 Sheets-Sheet 3
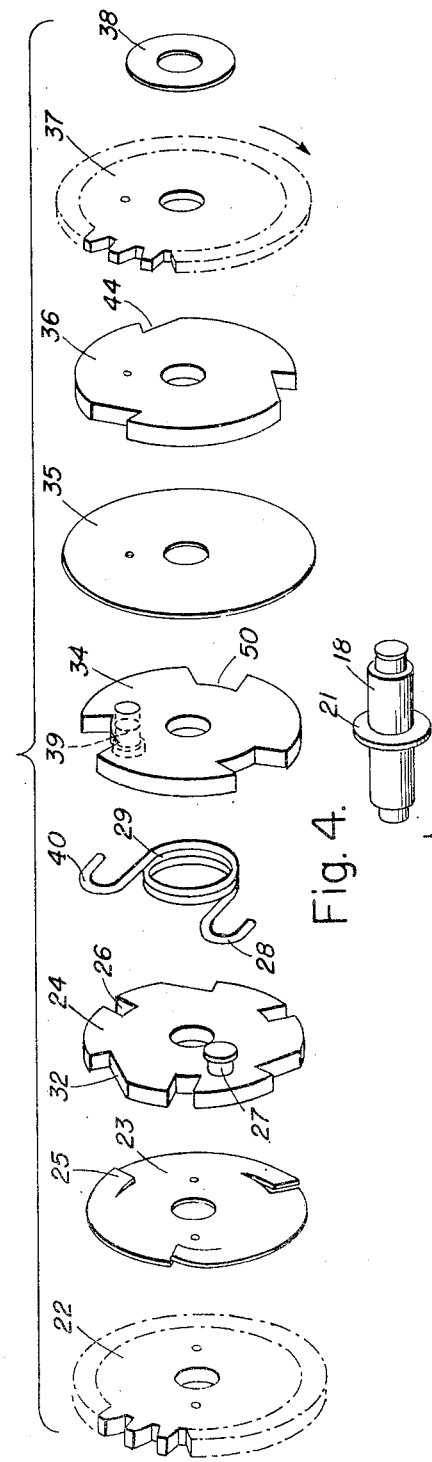
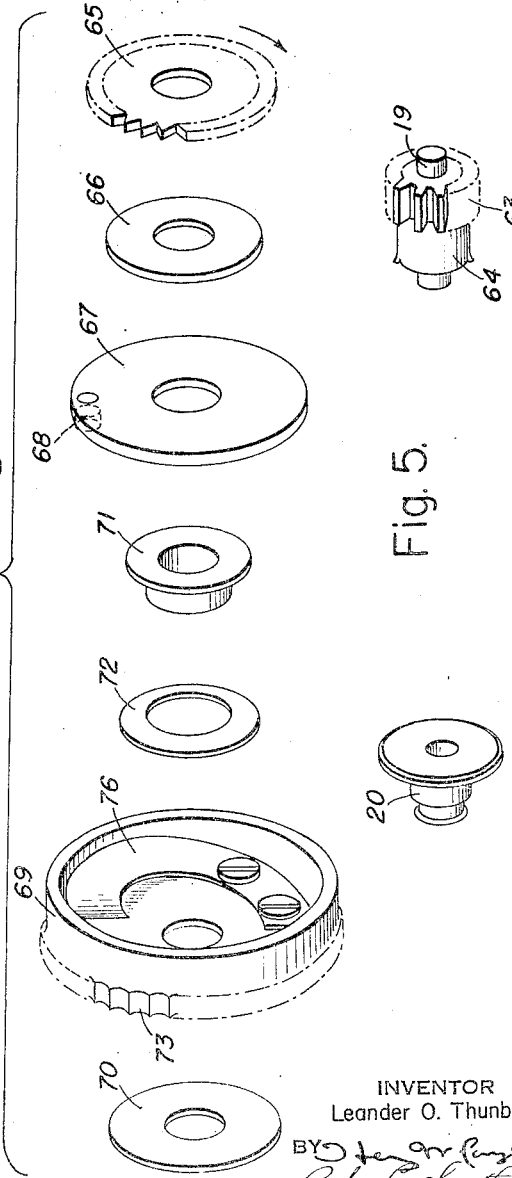
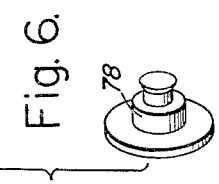
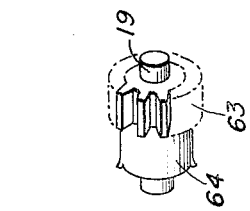
INVENTOR
Leander O. Thunberg
ATTORNEYS Feb. 13, 1951 L. O. THUNBERG 2,541,895
FLASH SYNCHRONIZER FOR PHOTOGRAPHIC SHUTTERS
Filed Sept. 18, 1947 4 Sheets-Sheet 4
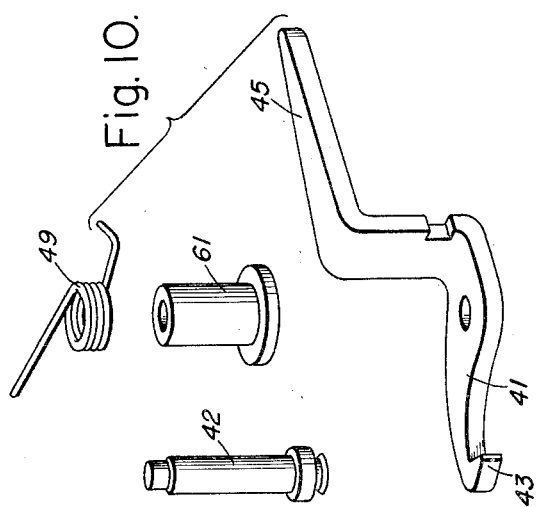
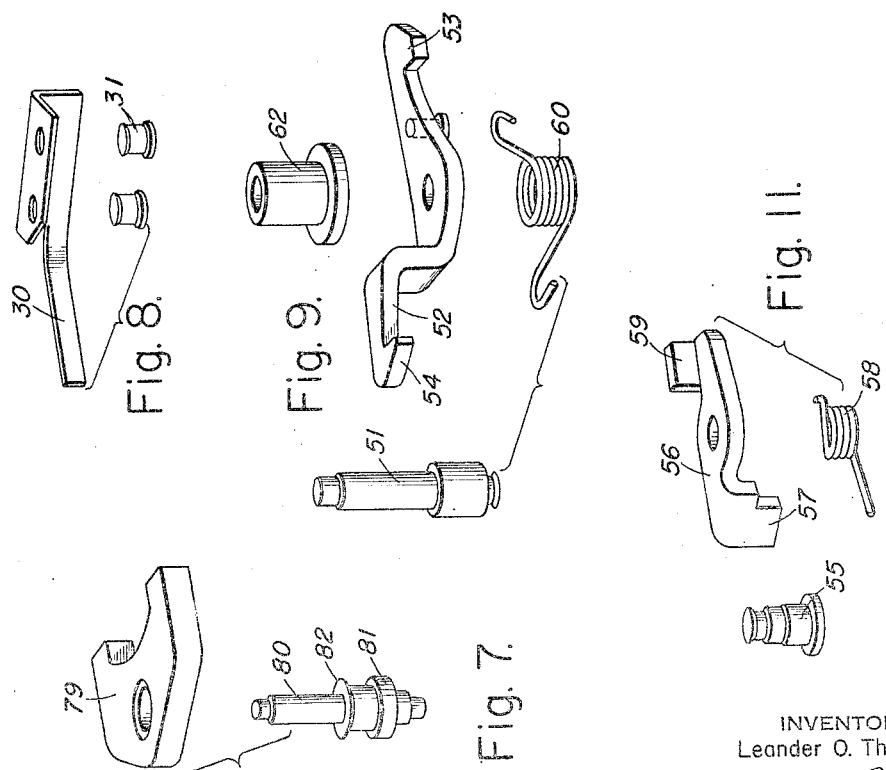
INVENTOR
Leander O. Thunberg
BY
ATTORNEYS Patented Feb. 13, 1951

2,541,895

UNITED STATES PATENT OFFICE 2,541,895

FLASH SYNCHRONIZER FOR PHOTOGRAPHIC SHUTTERS

Leander Olov Thunberg, Johnson City, N. Y., assignor to General Aniline & Film Corporation, New York, N. Y., a corporation of Delaware Application September 18, 1947, Serial No. 774,821

4 Claims. (Cl. 95—11.5)

This invention relates to flash synchronizers for photographic shutters. More specifically, the invention relates to such synchronizers for use in shutters of the type adapted to be enclosed within a casing and known as interlens or symmetrically opening shutters.

Among the objects of the invention is that of devising a simple and rugged synchronizer which is easily enclosed within the usual interlens shutter casing, which may be installed or detached as a unit and which requires a minimum of redesigning or adjustment of the basic shutter mechanism.

Another object of the invention is that of devising a flash synchronizing mechanism which, except for a relatively few parts, always functions by rotation in a single direction and in which none of the contact carrying parts rotates reversely so as to make necessary safety switches or render the mechanism subject to igniting the flash bulb when the shutter is set.

Another object of the invention is that of devising a flash synchronizing mechanism which shall function directly upon or from the master shutter member so far as the tensioning or setting of the synchronizer and release of the shutter blade actuating mechanism is concerned.

It is another object of the invention to devise a flash synchronizer in which the release of the master member is always accomplished through the synchronizer which remains connected and, therefore, need not be independently set each time it is desired to make a flash exposure.

It is a further object of the invention to provide a flash synchronizing means which shall serve by setting a simple dial or graduated drum to provide any desired delay from zero or instantaneous flash up to a maximum necessary for commercially available bulbs.

Another object of the invention is that of devising flash synchronizing means which, although tensioned by the setting movement of the master member, does not release the master member until the flash has been ignited and permitted to build up to its maximum intensity, or which will build up to that intensity just as the blades reach their completely open position. The master member when released immediately moves under substantially unrestrained influence of its power means for effecting opening of the blades thereby offering no appreciable resistance to movement of such parts which might slow down the shutter, especially at higher speeds.

Another object of the invention is that of providing a flash synchronizing mechanism for shutters which will be simpler than most such mechanisms now employed and in which no contact members which have to be engaged and actuated by other means are used. Along with this object of the invention, the synchronizer herein described is especially designed to avoid the employment of any special locking members, special connecting means, or means for selectively establishing a connection between the release lever and the actual elements which function to release the master member or other means through which power is delivered to the blade ring.

Other objects will become apparent from the following disclosure.

As will be described in greater detail hereinafter, the synchronizer is especially adapted to use with interlens shutters of which one well-known example, and incidentally that herein shown, is the Compur-Rapid Shutter. The shutter blade mechanism tied together by a blade ring is actuated through linkage connected to a so-called master member (here a master ring) moved in a rotary or other manner by a spring under considerable tension.

The usual release for the master member has been dispensed with and release of the shutter effected by the ordinary release lever is, according to the invention, always accomplished through a retard or flash timing mechanism. The period of time required for this retard mechanism to release the master member after it has been set in actuation by the shutter release lever is a constant for any given installation. The flash bulb circuit is completed by contact means moved into engagement after release of the synchronizer and at a definite and predetermined interval before release of the master member depending upon the number of milliseconds required for the bulb or other flash means to build up to its maximum or peak intensity.

The mechanism itself is relatively simple and may be assembled independently and then installed as a unit in the shutter casing. Parts, except for those incidental to setting or tensioning the synchronizer, are rotatable in one direction only. Those rotatable parts are mainly carried by two short shafts or spindles, one such spindle mounting the parts incidental to setting the device and for releasing the master member while the other spindle carries the contact members and the retarding elements. The contact and retarding means are rotatable throughout a single revolution (360°) at each release of the shutter. That always brings the parts back to their initial position so that there is no further setting thereof required preparatory to effecting any flash and/or release. The parts of the first-mentioned spindle preferably rotate throughout ⅓ of a revolution, but they may rotate any partial revolution depending upon the travel of the master member by means of which the synchronizer setting is effected, the practical gear ratio, and other factors.

The invention will be described in greater detail by reference to the accompanying figures of drawing in which like reference numerals are applied to the same parts in the several views. In the figures of drawing:

Fig. 4 is an exploded view of those parts on one of the shafts at Figs. 1 and 2.

Fig. 5 is a similar exploded view of the retard mechanism on the upper shaft, Fig. 1 and Fig. 3.

Fig. 6 is an exploded view of the idler gear and its supporting stud.

Fig. 7 is an exploded view of the pallet and the shaft on which it operates.

Fig. 8 is a similar view of a spring pawl which prevents back movement of certain parts.

Fig. 9 is an exploded view of the master member release lever and cooperating parts.

Fig. 10 is a similar view of the synchronizer releasing means.

Fig. 11 is a similar view of the master member latch.

Figure 1:
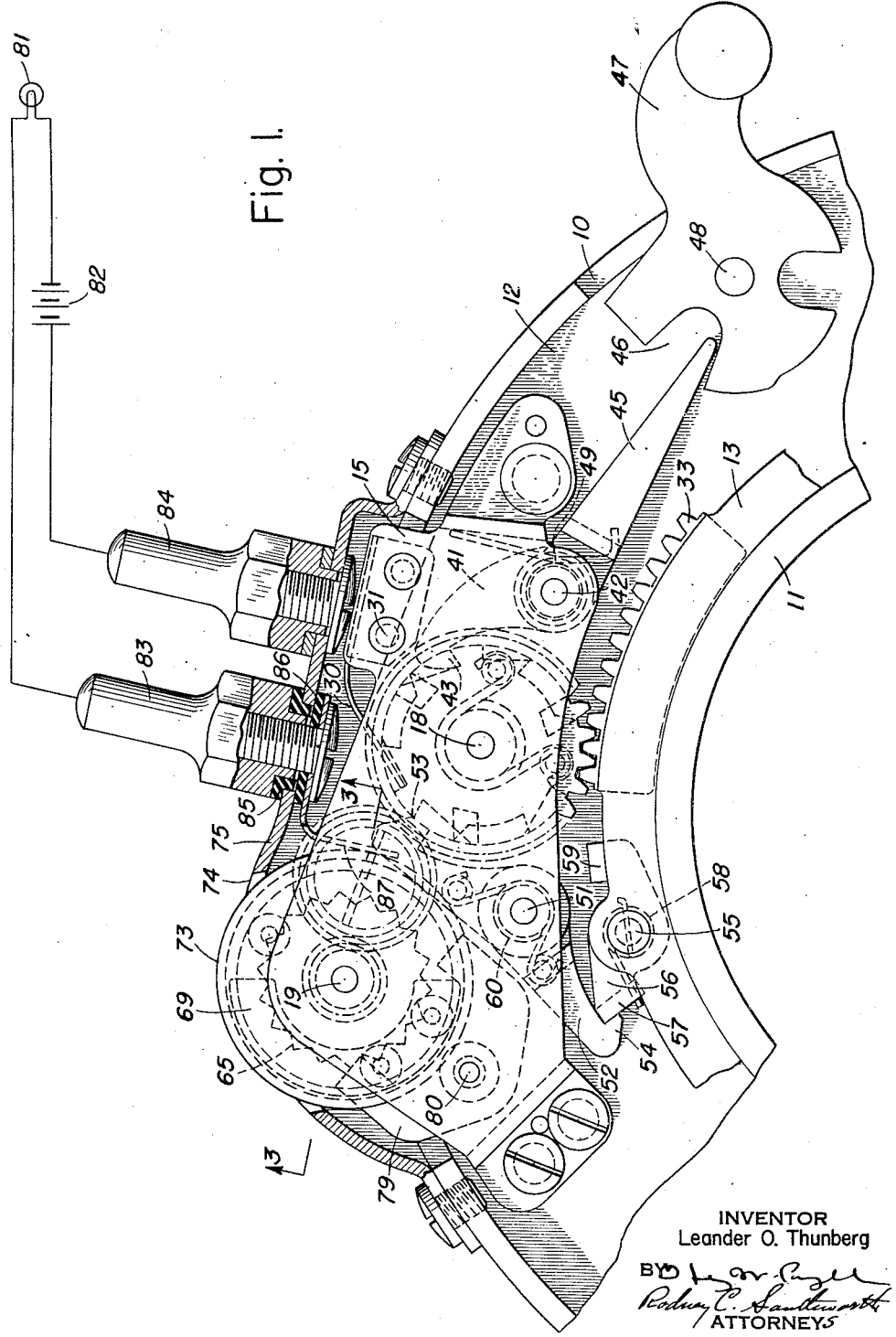
Fig. 1 is an elevation, a few parts being in section, showing the general layout of the device as seen from the front of the shutter.

Now referring to Figs. 1, 2, and 3, synchronizer mechanism which comprises a preferred form of the invention will be described in detail. The synchronizer parts occupy about 60° of the interior space within the annular shutter casing comprised of an outer cylindrical wall 10, an inner wall 11 and an intermediate transverse wall or mechanism plate 12. While the shutter is of more or less conventional design and may take the form illustrated in United States Patent No. 1,687,123, it is to be understood that the synchronizer is not limited to any particular shutter, but is to be applied to and used with any shutter for which it may be found useful. These shutters have a master member which is movable to and from a set or cocked position and which functions through connected linkage to open and close the shutter blades. The master member 13 is herein comprised as a ring and is easily oscillatable on or about the inner cylindrical closure member 11 and corresponds to the part 5 of the patent above mentioned. The synchronizer itself is contained between or upon plates 14 and 15 which are bent inwardly adjacent their ends to form the abutting mounting lugs 16 and 17. These lugs are attached to the mechanism plate 12 of the shutter by suitable screws or other quickly or readily detachable means. Preferably, the mounting within the shutter is slightly adjustable to effect proper relative positioning of the parts.

The rotatable parts other than the latching means or levers, pallet, and one idler gear are mounted upon spindles or shafts designated by numerals 18 and 19. All parts mounted upon the shaft or spindle 18 are shown in the exploded view, Fig. 4, and each of these parts and its function will hereinafter be described in greater detail. These Figs. 4 and 5 show the parts from left to right as they are arranged on the spindles proceeding from top to bottom, Figs. 2 and 3. The spindle 19, Figs. 3 and 5, is really comprised of that spindle itself and a shoulder stud 20 which are concentrically guided and upon which several parts are mounted. Those parts will be described in greater detail in later paragraphs. In the exploded view of Fig. 5, they are shown separately.

Figure 2:
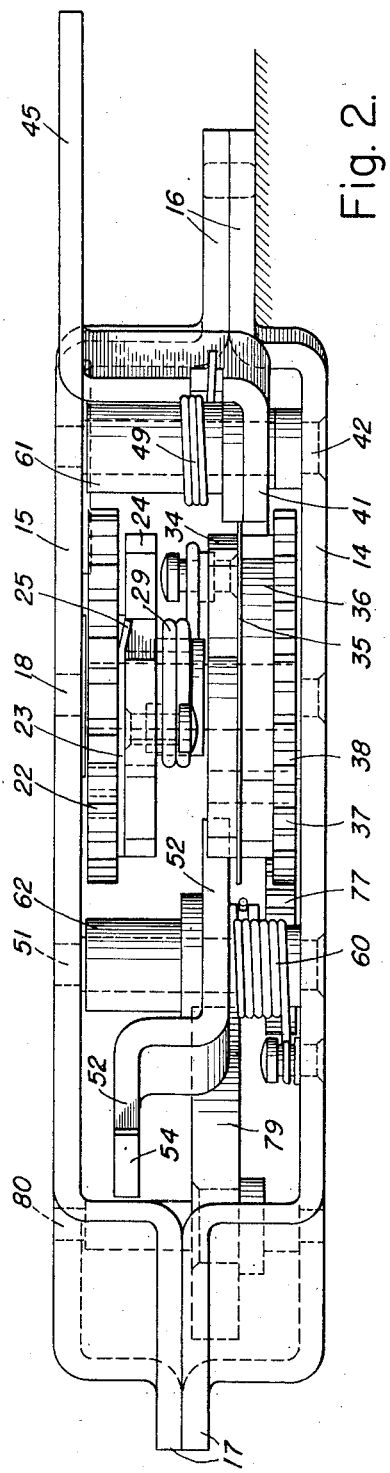
Fig. 2 is a plan view looking upwardly from the bottom of Fig. 1.

Referring to Figs. 1, 2, and 4, the spindle 18 which is fixed against rotation and is actually riveted in place in at least one of the plates 14 or 15 has at its center a collar 21. At the left-hand end of that spindle are carried, in the order shown in the exploded view, a gear 22, a clutch plate 23, and a clutch drive and spring tensioning disk 24. These parts are all freely rotatable on the spindle 18 except as otherwise retained in a fixed position. The gear 22 and clutch drive member 23 are interconnected by rivets or in any other manner, so that rotation of the gear 22 by means of the projecting clutch dogs 25 rotates the disk 24 correspondingly. The clutch dogs 25 engage within the rectangular notches 26, there being three dogs in the plate 23 and three notches in plate 24. The plate 24 carries a spring retaining rivet 27 which engages the hooked end 28 of spring 29 coiled about the spindle 18.

Now referring to Figs. 1 and 8, a spring detent or pawl 30 attached by rivets 31 to the side plate 15 engages one of the notches 32 to prevent reverse rotation of the disk. There are likewise three notches 32 so spaced that after the setting or tensioning movement of the gear 22, the pawl will snap into the adjacent notch 32 to retain the spring 29 in its tensioned state. That detent also serves to retain the parts against rotation in the reverse direction when the shutter is released at which time the gear 22 and clutch 23 move in a clockwise direction, Fig. 1, those being the only parts which are at any time reversely rotated. Then the dogs 25 spring away from and slide past the disk 24 until they engage the next following notches 26.

The gear 22 is in constant mesh with a segment 33 permanently attached to the master member 13. Movement of the master member in a clockwise direction, Fig. 1, rotates gear 22, ⅓ revolution to tension spring 29. The tension in this spring 29 later serves upon shutter release to impart the necessary movement to the remainder of the synchronizer for carrying it through its cycle.

Continuing with Fig. 4, the opposite end of the spindle 18 has mounted thereon cam plate 34, separator 35, locking disk 36, gear 37, and washer 38. These parts, with the exception of the washer, are attached to rotate as a unit, preferably being interconnected by a pin projecting through the four elements. Cam plate 34 has a spring retaining rivet or pin 39 engageable within the opposite hooked end 40 of spring 29.

While these elements are free to rotate on spindle 18 and tend to turn under the influence of spring 29 in a counterclockwise direction, Fig. 1, they are held, except at release, by a locking element in the form of a lever 41 pivoted at 42 and having a nose 43 adapted to fall into the notches 44 in the locking disk 36. This lever 41 has an offset extending portion 45, the end of which is engageable within a recess 46 in shutter release lever 47 pivoted at 48. The release lever 47 is more or less conventional for shutters of this type. A spring 49 tensions lever 41 in a direction to maintain the nose 43 in engagement with a notch 44 except as it is withdrawn by the appropriate movement of the release lever 47.

The cam plate 34 has three notches or other cam elements 50 which serve to release the master member as will presently be described. On a pivot pin 51 is mounted a two-armed lever 52 which has at its upper end, Fig. 1, a nose portion 53 which is normally maintained upon the outer periphery of disk 34, but which may fall into one if the cam notches 50 as the mechanism is rotated by spring 29 upon release of the lever 41 as above described. This lever 52 has at its opposite end a catch 54 engageable with a latching member attached to the master ring 13. This latching member is pivoted at 55 and has one arm 56 offset as at 57 to extend into the pathway of the catch 54. A spring 58 normally moves the lever clockwise, Fig. 1, it being stopped in the position shown by the angularly bent end of the lever 59 which engages the outer surface of the master ring.

Whenever the nose 53 of the lever 52 drops into one of the cam notches 50 under the influence of a coil spring 60, the catch 54 will be withdrawn from the latching member thereby permitting the shutter to open and close as controlled by the master member in the usual manner. Upon tensioning the shutter at which time the master ring 13 is moved to the position of Fig. 1, the spring 58 permits a slight rotation of the latching member so that it may pass under catch 54. The setting movement actually provides for rotating ring 13 slightly beyond the position of Fig. 1 to make certain that the above-mentioned parts are properly engaged.

In Fig. 10 details of the lever 41 are shown more clearly. The pin 42 on which that lever is pivoted is also shown in detail along with the spring 49 and a spacing sleeve 61.

In Fig. 9, details of the lever 52 are similarly shown along with the pivot 51, the spacing sleeve 62 and the spring 60.

In Fig. 11, details of the latching member 56, its pivoted stud 55 and the spring 58 are shown.

Figure 3:
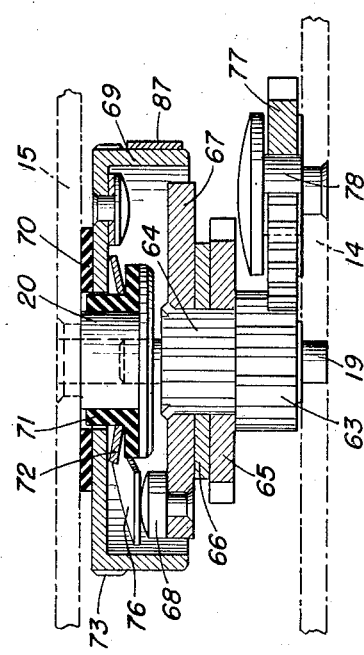
Fig. 3 is a section taken through the retard mechanism at line 3—3, Fig. 1, certain parts being displaced so as to illustrate them more clearly in a single view.

Now referring to Figs. 1, 3, and 5, the retarding and contact parts of the mechanism are mounted upon or rotate on a spindle 19, one end of which is borne within plate 14 and the other end of which is held within the central bore of the shoulder stud or rivet 20. The spindle 19 has either fixed thereto or machined as a part thereof a pinion 63 and an extending hub 64. On the hub 64 are fixed a star wheel 65, a spacer 66 and a plate 67, the latter carrying contact button 68. All of these parts 63—68 are, after assembly, comprised as a unit and are clamped together in such a manner that they rotate as a unit.

The shoulder stud 20 supports a drum 69 which is insulated from other parts of the device by the washers 70 and 71 made of a plastic or some other suitable non-conducting material. A spring washer 72 retains the drum 69 in any set position, but permits it to be moved by application of reasonable force applied to the outer serrated surface 73 which projects through a suitable slot or aperture 74 in the casing extension 75 attached to the casing member 10.

Drum 69 also carries at its interior portion a spring conductor 76 riveted or otherwise connected at the top portion of the drum, Fig. 3, and so disposed that its free end which is bent in a suitable arc may be contacted by the button 68 as the disk 67 moves that button to wipe past the free end of the spring. The flange portion of drum 69 is suitably marked from zero to a maximum indication depending upon the maximum period of delay necessary for permitting the slowest firing bulb to build up to peak intensity. Those indications may be set against an index mark at the casing 75 and the relative arrangement or position of parts is such that when the drum is set at 20 milliseconds, for example, the release of the synchronizer will cause button 68 to make an electrical contact with the element 76 long enough before shutter release to permit the bulb to reach peak intensity when the blades reach substantially open position. That requires an amount of retardation before release of the master ring slightly less than the bulb lag when it is considered that release through the lever 52, etc., requires a few milliseconds and that the ring 13 must move an appreciable distance to open the shutter blades.

Power from spring 29 through gear 37 is conveyed to the pinion 63 through an idler gear 77, Figs. 1, 3, and 6. This idler gear 77 is freely rotatable upon a shoulder stud 78 riveted to the side plate 14.

Referring to Figs. 1 and 7, the star wheel 65 is engaged by a pallet 79 pivoted on spindle 80, the latter being provided with collars 81 and 82 for positioning the pallet to align with the star wheel.

The flash bulb circuit includes a bulb 81, a battery or other source of power 82 and the essential conductors which, of course, attach in some way, preferably by a small plug, to the prongs 83 and 84 which form a permanent connecting means at the shutter casing. Since the circuit grounds through the shutter casing, the prong 84 is in electrical connection therewith. Prong 83, however, is insulated from the casing members by insulating washers 85 and 86 but connects to the drum 69 by a spring contact member 87. Thus the circuit is completed through the insulated drum 69 whenever button 68 contacts spring 76, current being carried from the drum to the insulated prong 83 by the spring contact member just mentioned.

Operation

Assuming that the shutter has been released and parts are in a so-called position of rest or untensioned state, the usual priming lever or other shutter cocking means is employed to tension the shutter spring or springs and at that time the master ring 13 is rotated clockwise, Fig. 1, to the position shown. During that movement of ring 13, the sector 32 by its engagement with gear 22 rotates that gear ⅓ of a revolution to tension the synchronizer spring 29. While in the general description of the mechanism and parts employed therein, mention has been made of a movement amounting to ⅓ revolution for the parts on spindle 18, and one revolution for the parts on spindle 19, the release of the mechanism immediately produces something slightly less than the said ⅓ and complete revolution. The tension in spring 29 is sufficient to carry the mechanism through a cycle which will make electrical contact to fire the bulb and to release the master member. The parts stop, however, when the nose 53 of the lever 52 engages one of the notches 50 into which it has fallen. The tension in the spring 29 is not sufficient at that time to continue rotation and to raise the nose 53 to the surface of the plate 34 against the tension of spring 60. Thereafter the setting movement and the tensioning of spring 29 carries the parts 34, 35, 36, and 37 throughout the remainder of their ⅓ revolution of travel until the nearest notch on the disk 36 is engaged by the toe 43 and the latching lever 41. The parts then rotated by gear 22 and including clutch 23 and disk 24 tension spring 29 to the complete extent intended preparatory to effecting a second release of the mechanism and of the shutter. To accomplish that, the clutch 23 engaging notches 26 in the disk 24 imparts the winding movement of gear 22 to the said spring 29. The ⅓ revolution through which the disk moves causes the pawl 30 to engage the next following notch 32 so that tension is maintained in the spring 29 except as it is relaxed upon release of the synchronizer as will be later described.

Since after the first part of the setting movement, gear 37 is held stationary, none of the parts on spindle 19 is moved and thus no contact between the button 68 and spring conductor 76 is possible. The master ring 13 is locked in set position as the locking member 56 passes beneath the catch 54 on lever 52. Now, the nose 53 of the lever is in raised position on the outer periphery of the cam disk 34.

Depending upon the time lag for the particular flash bulb employed, drum 69 will have been set so that the button 68 will contact spring 76 sooner or later depending upon the setting for the particular flash bulb for a relatively long time lag or a shorter one. If the time lag is zero, the contact will be effected at substantially that time at which the blades reach their fully opened position. Then the spacing between the button and the contact point or end of spring 76 is a maximum. For a period having a relatively long lag, the parts effect electrical contact early or at just about the time the star wheel and disk 67 start to move so that advantage is taken of the maximum period of retardation before the master member is released and the blades opened. Upon release, the lever 47 is moved counterclockwise, Fig. 1, acting through the arm 45 to swing the lever 41 and its toe portion 43 away from engagement with notch 44 in disk 36. That frees the parts 34—37 for movement under the influence of the tensioned spring 29. Then through the idler 77 and pinion 63, disk 67 is rotated at a relatively slow rate due to the retarding effect of pallet 79 in engagement with the star wheel 65.

After a predetermined angular movement of the parts, the nose 53 of lever 52 is permitted to drop into one of the cam notches 59, the spring 60 tending to urge it in that direction. That withdraws catch 54 from latching member 56 thereby releasing the shutter mechanism itself.

It is to be understood that the parts on spindle 19 rotate through slightly less than a complete revolution while those on spindle 18 rotate less than the ⅓ revolution incidental to a complete cycle, the gear ratio being designed to provide for that movement. The parts are stopped when the end of the toe 53 reaches the extremity of its travel in one of the cam notches 59. Just prior to this, the release of the master member will have been effected so that the releasing phase of the cycle will have been completed. The parts remain in position until the synchronizer and shutter are reset preparatory to making another exposure. Upon resetting, the remainder of the complete revolution for parts at spindle 19 and ⅓ revolution of parts on spindle 18 is effected incidentally to the tensioning of spring 29.

The contact button 68 makes a wiping contact with the end of spring 76 and always passes beyond that member after the bulb is fired so that the parts will again be ready for effecting another flash when desired. There is no relative movement between the drum 69 and the contact button 68 except when the synchronizer is released, or when the drum itself is being adjusted to take care of correct time lag for the bulb in use. Since the parts make no contact during the setting movement, it is not necessary to provide especially for avoiding firing the bulb which may already have been inserted in the lamp. It is not possible to fire the bulb except upon intended contact which must occur during the period between release of the synchronizer mechanism and the point at which that mechanism stops after moving through its intended angular extent.

The return or counterclockwise movement of master ring 13 after release thereof reversely rotates the gear 22. Since the clutch dogs 25 are relatively flexible, they are merely pressed into alignment with the main clutch plate 23 until they reengage the notches 26 after a reverse movement of ⅓ revolution. At that time no reverse rotation of the disk 24 is possible due to the engagement between pawl 30 and one of the notches 32.

While the invention has been described as applied to a shutter having a master ring of considerable diameter, it can be used with other shutters, some having master members with a rectilinear movement and others being formed more as a lever or cam of relatively small dimensions. The synchronizer is equally applicable to such shutters and the parts may in such instance be altered so that tensioning of the synchronizer is effected by a smaller gear, by a rack, or other more appropriate means. In some instances, it may be desirable to change the gear ratio between the gear 37 and pinion 63 so that there need be a greater or a lesser movement of the parts on spindle 18 for the single revolution of those parts on spindle 19.

While the circuit herein shown provides for grounding on one side, it will be readily understood by those familiar with electrical devices that the prong 84 may be insulated and a direct connection provided so that a circuit may be completed through disk 67 and other parts as they are now shown without including in the circuit the entire shutter mechanism.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a photographic shutter having a casing, a master member movable to and from a set position and a shutter release means, a flash synchronizer and master member release comprising a retard means rotatable throughout 360°, contact members in connectable circuit with a flash bulb including a drum electrically connected to one side of said circuit and having fixed thereto a spring contact member, said drum being angularly adjustable to vary the position of said contact member, and a second contact member rotatable with said retard means and operable to engage said spring contact member after a predetermined angular movement depending upon the initial setting of said drum, a drive means for said retard means including a spring loaded means rotatable in one direction only and having a cam, a latching member for said master member releasable upon engagement of a part thereof with said cam to release the master member, interengaging means on said master member operable through a unidirectional clutch for tensioning the spring loaded means, and a releasable locking means operable by said shutter release means for releasing the tensioned spring loaded means thereby rotating said retard means for effecting engagement of said second contact member with said spring contact member for closing said flash circuit.

2. In a photographic shutter having a casing, a master member movable to and from a set position and a shutter release means, a flash synchronizer and master member release comprising a retard means rotatable throughout 360°, contact members in circuit with a flash bulb including a drum electrically connected to one side of said flash bulb circuit and having fixed thereto a spring contact member, said drum being angularly adjustable to vary the position of said contact member in accordance with desired compensation for the lag in a flash bulb to be used within the circuit, a star wheel and a disk connected to said star wheel, said disk having a contact button adjacent its periphery for engagement with said spring contact member upon rotation of said star wheel and disk, a vibrating pallet engaging said star wheel for retarding the rotation thereof, a driving means for said star wheel and disk comprising in operable relation on a fixed spindle, a gear, a locking disk and a cam plate, an idler gear meshing with said last-mentioned gear and a pinion fixed for rotation with said star wheel for imparting rotation thereto, and means for urging said interconnected gear, locking disk, and cam plate in a direction to drive the said retard means comprising a spring, a spring winding gear and a clutch, said spring being connected to said clutch at one end and to the combined gear, locking disk and cam plate at its other end, means for preventing movement of that part of said clutch to which the said spring is attached in a reverse direction and a gear segment attached to said master member and meshing with said spring winding gear for moving the gear and clutch in a direction to tension said spring, a retractable latch member pivoted to said master member and a pivoted two-arm lever having at one end a catch engageable with said retractable latch member and having at its other end a nose portion for engaging within cam notches in said cam plate, a latch means operable by said shutter release for releasing the locking disk thereby to permit rotation of said cam plate, locking disk and gear under the influence of said tension spring for rotating the retard means and for moving a cam on said cam plate to a position for receiving the nose of said two-arm lever thereby to release the master member.

3. Mechanism as claimed in claim 2, wherein said cam plate is provided with three master member release cam notches and said driving means has a ratio of 1 to 3 thereby to rotate the retard means one revolution while the master release means rotates ⅓ revolution.

4. Mechanism as defined in claim 2, wherein said spring driven master release cam plate and retard gear drive means are rotatable on a spindle on which are also mounted a spring winding gear and clutch, and means for rotating said winding gear which comprises a gear segment on said master member.

LEANDER OLOV THUNBERG.

REFERENCES CITED

The following references are of record in the file of this patent:

UNITED STATES PATENTS

| Number | Name | Date |
| --- | --- | --- |
| 2,291,190 | Schwarz et al. | July, 28, 1942 |
| 2,304,035 | Steiner | Dec. 1, 1942 |
| 2,355,825 | Schwarz | Aug. 15, 1944 |
| 2,358,941 | Schwarz | Sept. 26, 1944 |
| 2,404,526 | Pirwitz | July 23, 1946 |
| 2,405,741 | Fuerst | Aug. 13, 1946 |
| 2,448,876 | Fuerst | Sept. 7, 1948 |